United States Patent
Ovshinsky et al.

(10) Patent No.: US 6,627,148 B1
(45) Date of Patent: Sep. 30, 2003

(54) SAFE, ECOMOMICAL TRANSPORT OF HYDROGEN IN PELLETIZED FORM

(75) Inventors: Stanford R. Ovshinsky, Bloomfield Hills, MI (US); Rosa T. Young, Bloomfield Hills, MI (US); Ned T. Stetson, Lake Orion, MI (US); Vitaliy Myasnikov, Birmingham, MI (US)

(73) Assignee: Energy Conversion Devices, Inc., Rochester Hills, MI (US)

( * ) Notice: Subject to any disclaimer, the term of this patent is extended or adjusted under 35 U.S.C. 154(b) by 0 days.

(21) Appl. No.: 09/634,678

(22) Filed: Aug. 8, 2000

Related U.S. Application Data

(63) Continuation-in-part of application No. 09/435,497, filed on Nov. 6, 1999, now Pat. No. 6,193,929.

(51) Int. Cl.$^7$ .............................................. C22C 23/00
(52) U.S. Cl. ......................... 420/402; 420/900; 75/230
(58) Field of Search .................................. 420/900, 402, 420/403, 404, 405, 406; 423/644; 75/230

(56) References Cited

U.S. PATENT DOCUMENTS 4,637,967 A * 1/1987 Keem et al. ................ 429/101
5,443,616 A * 8/1995 Congdon ..................... 75/240
5,964,965 A * 10/1999 Schulz et al. ............... 148/420
6,143,052 A * 11/2000 Kiyokawa et al. ............ 75/230

OTHER PUBLICATIONS

"Synthesis of Mg2Ni alloy by bulk mechanical alloying", Aizawa et al, Journal of Alloys and Compounds, 1999, pp 248–253.*

"Immobilization of Active Metal Hydride Particles in a Polymer Matrix", Tinge et al, Zeitschrift fur Physikalische Chemie, 1994 pp 1489–1493.*

"Determination of Properties of a New Type LaNi5 Hydride Complex Material", Chui, Hua et al. Hydrogen Syst., Pap. Int. Symp., meeting date 1985, vol. 1, pp 451–458.*

* cited by examiner

Primary Examiner—George Wyszomierski
Assistant Examiner—Janelle CombsMorillo
(74) Attorney, Agent, or Firm—Frederick W. Mau, II; David W. Schumaker; Marvin S. Siskind

(57) ABSTRACT

A magnesium hydrogen storage alloy that has been hydrided and compacted into highly dense pellets for shipment and use, a method for making said magnesium alloy and a method for the safe, economical shipment of said hydrided magnesium hydrogen storage material.

16 Claims, 7 Drawing Sheets

Absorption Kinetics
- Surface Catalytic Activity
  - Catalytic sites
  - Surface area
- Nucleation Density
  - Surface nucleation
  - Bulk nucleation
- Growth Rate
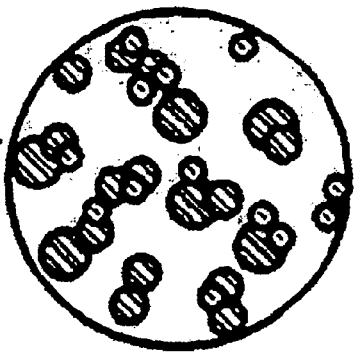
Bulk Nucleation
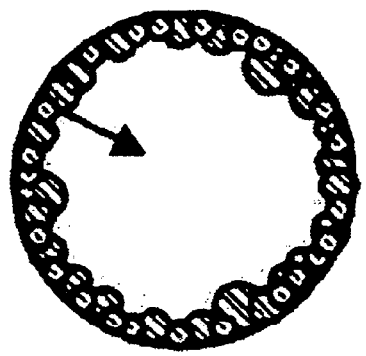
Surface Nucleation
Figure 2

COMMON TABLET SHAPES

| # | Shape | # | Shape | # | Shape | # | Shape |
|---|---|---|---|---|---|---|---|
| 1 | STANDARD CONVEX | 2 | STANDARD CONVEX BISECT NOT FLUSH | 3 | STANDARD CONVEX QUADRISECT FLUSH | 4 | STANDARD CONVEX STRAIGHT-THRU BISECT |
| 5 | COMPOUND CUP | 6 | CONVEX WITH BEVEL | 7 | FLAT-FACED PLAIN | 8 | FLAT-FACED BEVEL-EDGED |
| 9 | FLAT-FACED BEVEL-EDGED BISECT | 10 | FLAT-FACED BEVEL-EDGED QUADRISECT | 11 | FLAT-FACED RADIUS-EDGED | 12 | LOZENGE |
| 13 | MODIFIED BALL | 14 | CORE ROD TYPE (HOLE IN CENTER) | 15 | CAPSULE | 16 | MOD CAPSULE |
| 17 | OVAL | 18 | BULLET | 19 | ARROW HEAD | 20 | TRIANGLE |
| 21 | ARC TRIANGLE | 22 | SQUARE | 23 | PILLOW (ARC SQUARE) | 24 | RECTANGLE |
| 25 | MODIFIED RECTANGLE | 26 | DIAMOND | 27 | PENTAGON | 28 | HEXAGON |
| 29 | OCTAGON NATURAL EDGE | 30 | HEART | 31 | HALF MOON ("D" SHAPE) | 32 | ALMOND |

Figure 6

SAFE, ECOMOMICAL TRANSPORT OF HYDROGEN IN PELLETIZED FORM

RELATED APPLICATIONS

The instant application is a continuation-in-part of U.S. application Ser. No. 09/435,497 now U.S. Pat. No. 6,193,929, entitled "High Storage Capacity Alloys Enabling a Hydrogen-Based Ecosystem", filed Nov. 6, 1999 for Ovshinsky et al.

FIELD OF THE INVENTION

This invention relates to materials useful for hydrogen storage, their use in forming further, densified or compacted, products useful for hydrogen storage and safe transport as well as processes for accomplishing their production and safe storage and transport.

BACKGROUND OF THE INVENTION

A patent entitled "A Hydrogen-Based Ecosystem" filed Nov. 22, 1999, U.S. Pat. No. 6,305,442 ('442), having common assignment and inventors with this application describes new magnesium-based hydrogen storage alloys with high hydrogen charge/discharge kinetics and remarkably high hydrogen storage capacity. Such material provides the basis for an entire national and international infrastructure based upon that inventive newly developed hydrogen storage capacity and means for using such materials made available by hydrogen storage alloys which have surmounted the chemical, physical, electronic and catalytic barriers previously believed to have been insoluble. Such alloys are fully described in U.S. Pat. No. 6,193,929 ('929), entitled "High Storage Capacity Alloys Enabling a Hydrogen-Based Ecosystem", filed Nov. 6, 1999 for Ovshinsky et al. That patent relates generally and specifically to alloys which solve the, up to now, unanswered problem of having sufficient hydrogen storage capacity with exceptionally fast kinetics to permit the safe and efficient storage of hydrogen to provide fuel for a hydrogen-based economy. The invention herein described takes the advancements of the previously mentioned patent, as well as other useful hydrogen storage materials and advances the art to the next level by making hydrogen storage materials safer, and more easily handled, transported, and used. The revolutionary breakthrough to provide the enhanced storage and kinetic combination became possible only by considering the materials as a system in which chemical modifiers and the principles of disorder and local order, as pioneered by Stanford R. Ovshinsky (one of the instant inventors), in a manner to provide the necessary catalytic locally ordered environments. Such use of the Ovshinsky principles include the design of surfaces for high kinetic and catalytic activity while at the same time, designing bulk characteristics for high levels of storage capacity and high rate charge/discharge cycling. In other words, these principles allowed for tailoring of the material by controlling the particle and grain size, topology, surface states, catalytic activity, microstructure, and total interactive environments for storage capacity. The invention of highly kinetic high capacity hydrogen storage materials made possible the hydrogen ecosystem, planning for which created the needs which are met by the practice of the current invention as described herein.

Fuel types and choices about them made over the past several generations in the industrialized nations of the world have created problems which, colloquially, are now "coming home to roost".

As the world's population expands and its economy increases, the atmospheric concentrations of carbon dioxide are warming the earth causing climate change. However, the global energy system is moving steadily away from the carbon-rich fuels whose combustion produces the harmful gas. Experts say atmospheric levels of carbon dioxide may be double that of the pre-industrial era by the end of the next century, but they also say the levels would be much higher except for a trend toward lower-carbon fuels that has been going on for more than 100 years. Furthermore, fossil fuels cause pollution and are a causative factor in the strategic military struggles between nations. Furthermore, fluctuating energy costs are a source of economic instability worldwide For nearly a century and a half, fuels with high amounts of carbon have progressively been replaced by those containing less. First wood, which is high in carbon, was eclipsed in the late $19^{th}$ century by coal, which contains less carbon. Then oil, with a lower carbon content still, dethroned "King Coal" in the 1960's. Now analysts say that natural gas, lighter still in carbon, may be entering its heyday, and that the day of hydrogen—providing a fuel with no carbon at all—may at last be about to dawn. As a result, experts estimate the world's economy today burns less than two-thirds as much carbon per unit of energy produced as it did in 1860, despite the fact that carbon based duels are still being used by the automotive industry.

In the United States, it is estimated, that the trend toward lower-carbon fuels combined with greater energy efficiency has, since 1950, reduced by about half the amount of carbon spewed out for each unit of economic production. Thus, the decarbonization of the energy system is the single most important fact to emerge from the last 20 years of analysis of the system. It had been predicted that this evolution will produce a carbon-free energy system by the end of the $21^{st}$ century. The present invention shortens that period to a matter of years. In the near term, hydrogen will be used in fuel cells for cars, trucks and industrial plants, just as it already provides power for orbiting spacecraft. But ultimately, hydrogen will also provide a general carbon-free fuel to cover all fuel needs.

As noted in recent newspaper articles, large industries, especially in America, have long been suspicious of claims that the globe is warming and have vociferously negated the science of climate change. Electric utilities, among others, initially took the position that international treaties on climate change would cut economic growth and cost jobs. A dramatic shift has now occurred, in which the problems are acknowledged and efforts are now being made to solve them. Therefore, it is very encouraging that some of the world's biggest companies, such as Royal Dutch/Shell and BP Amoco, two large European oil firms, now state plainly what was once considered heresy: global warming is real and merits immediate action. A number of American utilities vow to find ways to reduce the harm done to the atmosphere by their power plants. DuPont, the world's biggest chemicals firm, even declared that it would voluntarily reduce its emissions of greenhouse gases to 35% of their level in 1990 within a decade. The automotive industry, which is a substantial contributor to emissions of greenhouse gases and other pollutants (despite its vehicular specific reductions in emissions), has now realized that change is necessary as evidenced by their electric and hybrid vehicles. In this field, the assignee of the subject invention, has developed the Ovonic nickel metal hydride battery, the enabling battery making electric and hybrid vehicles possible.

While hydrogen has wide potential application as a fuel, a major drawback in its utilization, especially in mobile uses such as the powering of vehicles, has been the lack of an acceptable lightweight hydrogen storage medium. Storage of hydrogen as a compressed gas involves the use of large and heavy vessels. Thus, as shown in FIG. 1, compressed hydrogen at 5000 psi only has a hydrogen density of 31 g/liter. Additionally, large and very expensive compressors are required to store hydrogen as a compressed gas and compressed hydrogen gas is a very great explosion/fire hazzard.

Hydrogen is the "ultimate fuel." In fact, it is considered by most to be "THE" fuel for the next millennium, and, it is inexhaustible. Hydrogen is the most plentiful element in the universe (over 95%). Hydrogen can provide an inexhaustible, clean source of energy for our planet which can be produced by various processes which split water into hydrogen and oxygen. The hydrogen can be stored and transported in solid state form. For example, economical, lightweight, triple-junction amorphous silicon solar cells solar cells (an invention pioneered by Stanford R. Ovshinsky, one of the instant inventors) such as those set forth in U.S. Pat. No. 4,678,679, (the disclosure of which is herein incorporated by reference) can be readily disposed adjacent a body of water, where their inherently high open circuit voltage can be used to dissociate water into its constituent gases, and collect the hydrogen so produced. Also, by placing these high efficiency, lightweight solar panels on nearby farms, in water, or on land. Also, the photovoltaic process for dissociating water to form hydrogen can be a step toward solving the problems of water purification throughout the world. Electricity can be generated to transport and pump the hydrogen into metal hydride storage beds that include the high storage capacity, lightweight metal hydride alloys. The ultra-high capacities of the alloys of the '497 application allow this hydrogen to be stored in solid form and transported by barge, tanker, train or truck in safe, economical form for ultimate use. Energy is the basic necessity of life and civilization for any society today and the use of hydrogen in the manner described herein as the basic source of energy would minimize the likelihood fought for control of fossil fuels.

In the past considerable attention has been given to the use of hydrogen as a fuel or fuel supplement. While the world's oil reserves are depletable, the supply of hydrogen remains virtually unlimited. Hydrogen can be produced from coal, natural gas and other hydrocarbons, or formed by the electrolysis of water, preferably via energy from the sun. Moreover hydrogen can be produced without the use of fossil fuels, such as by the electrolysis of water using nuclear or solar energy, or any other form of economical energy (e.g., wind, waves, geothermal, etc.). Furthermore, hydrogen, is an inherently low cost fuel. Hydrogen has the highest density of energy per unit weight of any chemical fuel and is essentially non-polluting since the main by-product of "burning" hydrogen is water. Thus, hydrogen can be a means of solving many of the world's energy related problems, such as climate change, pollution, strategic dependancy on oil, etc., as well as providing a means of helping developing nations.

While hydrogen has wide potential application as a fuel, a major drawback in its utilization, especially in mobile uses such as the powering of vehicles, has been the lack of an acceptable lightweight hydrogen storage medium. Storage of hydrogen as a compressed gas involves the use of large and heavy vessels. Thus, as shown in FIG. 1, compressed hydrogen at 5000 psi only has a hydrogen density of 31 g/liter. Additionally, large and very expensive compressors are required to store hydrogen as a compressed gas and compressed hydrogen gas is a very great explosion/fire hazzard.

Hydrogen also can be stored as a liquid. Storage as a liquid, however, presents a serious safety problem when used as a fuel for motor vehicles since hydrogen is extremely flammable. Liquid hydrogen also must be kept extremely cold, below −253° C., and is highly volatile if spilled. Moreover, liquid hydrogen is expensive to produce and the energy necessary for the liquefaction process is a major fraction of the energy that can be generated by burning the hydrogen. Another drawback to storage as a liquid is the costly losses of hydrogen due to evaporation, which can be as high as 5% per day. Also, the storage density of liquid hydrogen, as shown in FIG. 1, is only 71 g/liter.

For the first time, storage of hydrogen as a solid hydride, using the atomically engineered alloys of the instant application can provide a greater percent weight storage than storage as a compressed gas or a liquid in pressure tanks. Also, hydrogen storage in a solid hydride is safe and does not present any of the safety problems that hydrogen stored in containers as a gas or a liquid does because hydrogen, when stored in a solid hydride form, exists in it's lowest free energy state. As shown, again in FIG. 1, storage of hydrogen in a 7% Ovonic thermal hydrogen storage alloy provides a hydrogen density of 103 g/liter, more than 3 times the density of compressed hydrogen gas.

In addition to the problems associated with storage of gaseous or liquid hydrogen, there are also problems associated with the transport of hydrogen in such forms. For instance transport of liquid hydrogen will require super-insulated tanks, which will be heavy and bulky and will be susceptible to rupturing and explosion. Also, a portion of the liquid hydrogen will be required to remain in the tanks at all times to avoid heating-up and cooling down of the, tank which would incur big thermal losses. As for gaseous hydrogen transportation, pressurized tankers could be used for smaller quantities of hydrogen, but these too will be susceptible to rupturing and explosion. For larger quantities, a whole new hydrogen pipeline transportation system would need to be constructed or the compressor stations, valves and gaskets of the existing pipeline systems for natural gas will have to be adapted and retrofitted to hydrogen use, and this is assuming the construction material of these existing pipelines will be suited to hydrogen transportation.

It is a primary objective of the present invention to provide a means of safely and economically transporting hydrogen within a hydride storage material; particularly between a hydrogen generation facility and downstream distributors, but also between such downstream distributors and ultimate or intermediate users, or their combinations. It is understood by those ordinarily skilled in the art that hydrogen storage materials, whether Mg based, rare-earth metal based, or transition metal based, include very small particles composed of much smaller crystallites. Such metals of small size are inherently pyrophoric when exposed to atmosphere. Therefore, shipment of these hydrogen storage materials becomes a safety problem in which it has heretofore been necessary to transport such materials in an inert atmosphere.

Further, the amount of space occupied by a commodity requiring shipping over potentially long distances is a major cost and logistic consideration. The instant inventors originally considered the shipment of the hydrogen in the hydride storage powder itself for all downstream use. Upon reflection and weighing the potential regulatory pitfalls in transportation through interstate or other regulated commerce, the necessity of handling and hydriding the powder at a downstream location as well, as the cost associated with the shipment of large volumes of such powder, the inventors recognized a need to develop a superior transportation system.

Pursuant to the instant invention, the subject inventors have developed such a superior means of transporting hydrogen in hydride storage material over long distances in a safe and economical manner. To begin with, the inventors realized that the pyrophoric material could not be safely handled. The beginning of the solution to the handling problems was initially recognized when they realized that shipment of such hydrogen storage material in a highly hydrided state reduced the possibility of a pyrophoric reaction with the atmosphere. At the same time, it was hypothesized that if the density of the powder could be increased there would be a greatly reduced amount of surface area available for dangerous reactions with atmospheric components. The result was the invention of a high density hydrided pellet that is substantially immune to a pyrophoric atmospheric reaction and which could, therefore, be handled without the burdens associated with a non-reactive environment (generally an inert gaseous atmospheric blanket). Not only does such an invention allow for safe handling by workers, but such products can much more readily meet stringent transportation regulations when transported by on highways by trucks, by rail, by ship, or by air in interstate br other highly regulated commerce.

A further advantage of the hydrogen storage pellet of the instant invention is that the high density is achieved in its hydrided state, therefore, a large weight percent of hydrogen is stored per unit volume. Such notably high storage density substantially reduces the cost per hydrogen unit volume for shipment of that material; i.e.: substantially the same volume of hydrogen storage material can now be shipped with more than twice the weight percent of hydrogen stored therein. If the same volume of material can be shipped with twice the hydrogen stored therein, clearly the cost of shipment is reduced by at least half.

Additionally, we should not lose sight of the significant fact that the hydrogen storage magnesium alloy material which forms a preferred embodiment of the instant invention, in its hydrided powder-state, can already store more than 7 weight percent of that magnesium alloy material as hydrogen as well as discharge and charge the same with excellent rate kinetics.

It should be appreciated, therefore, that the present invention contemplates a method of safely transporting hydrogen in a hydride storage material by providing for shipment of said material as a compacted hydride, preferably in the form of discrete units or compacts, which may be referred to as pellets or tablets, in any one of a variety of possible, equally preferred, shapes. It should be understood that the scope of what is meant herein by "shipping" is in no way limited, but is meant to include any transportation of hydrogen within hydride storage material between any and all possible origins and destinations in any manner.

SUMMARY OF THE INVENTION

A first object of the present invention is to provide a method of safely, economically transporting hydrogen and hydrogen storage material by shipping said material as a discrete compacted hydrided alloy, preferably of a magnesium alloy and more preferably as a magnesium alloy with mischmetal or its components and also including silicon. The hydrogen storage material is compacted into one or more dense pellets of any size and shape desired by one skilled in the art, but the pellets preferably have a diameter of less than about 2.5 cm (1 inch) and a thickness of less than 4 millimeters, preferably less than 2 millimeters. The density of the hydrided magnesium alloy pellet is greater than 0.8 grams/cc, preferably greater than 1.0 grams/cc, and most preferably greater than 1.2 grams/cc. In a preferred embodiment of the invention, substantially no binder is added to the hydrided storage material or alloy prior to compacting the powdered alloy; the resulting pellets are loaded into bulk transport containers such as cargo transport containers, etc.

A second object of the invention is to provide a compacted hydrided hydrogen storage alloy having a density greater than 55% of its theoretical maximum, preferably greater than 85% of its theoretical maximum, and most preferably greater than 90% of its theoretical maximum. For a magnesium alloy, the density is between 0.8 to 1.45 grams/cc. The alloy is preferably compacted without a substantial amount of binder into pellets. The sizes of the hydrided alloy particles used in compacting the pellets is not of particular importance unless high dehydrogenation kinetics are important, in which case, the powder particles are preferably between 10 to 100 micrometers, and more preferably between about 20–63 micrometers. The pellets are shaped to provide pellet-packing density with less than 30% open. The pellets preferably have a diameter of less than about 2.5 cm (1 inch) and a thickness of less than 4 millimeters, preferably less than 2 millimeters. The magnesium alloy includes at least 2 weight % or more of occluded hydrogen.

A further object of the present invention is to provide a method of processing pyrophoric hydrogen storage material having a particle size between about 100 micrometers and 2 millimeters, grinding the powder, hydriding the ground powder and compacting the hydrided powder to form discrete bodies having a density of greater than about 0.8 grams/cc. After hydriding, the sizes of the hydrided alloy particles used in compacting the pellets is not of particular importance unless high dehydrogenation kinetics are important, in which case, the powder particles are preferably between 10 to 100 micrometers, and, more preferably between about 20–63 micrometers. The un-ground powder may be formed by gas atomization of magnesium alloy material and preferably rotary or centrifugal atomization. The grinding step is preferably performed in an attritor (but other mills, including ball mills may be used) and usefully also includes graphite powder and/or heptane grinding aids there within. The sizing step is preferably accomplished by passing the powder through at least one sieve to obtain the powder fraction having the desired particle size range. The discrete bodies are usefully packaged into bulk transport containers such as cargo transport containers, etc. for shipment.

Yet another object of the instant invention is provide a hydrided hydrogen storage alloy of magnesium that includes particles having a size distribution of 100 micrometers to 2 millimeters. Mischmetal elements are also included in the magnesium alloy, said alloy formed by cooling a melt thereof at a rate within the range of about $10^3$ to $10^5$ degrees C./sec. The magnesium alloy is formed by a rapid quench technique, such as gas atomization (rotary atomization), which provides the required quench rate.

A still further objective of the present invention is to provide a method for comminuting and hydriding a magnesium hydrogen storage alloy that comprises the step of minimizing oxidation of the exposed surfaces of the alloy, such as by conveying the alloy from the comminuter to the hydrider in an inert environment formed of a noble gas such as helium, neon, argon or combinations thereof. The hydrided magnesium alloy comprises particles, said particles sized between 10 and 100 micrometers and preferably between 20 and 63 micrometers and most preferably between about 20 and 37 micrometers.

BRIEF DESCRIPTION OF THE DRAWINGS

FIG. 2 presents a stylized representation of hydrogen absorption kinetics for surface and bulk nucleation.

FIG. 6 presents several schematic views of the types of compacts able to be made of the hydrided hydrogen storage material of this invention.

DETAILED DESCRIPTION OF THE INVENTION

Figure 1:
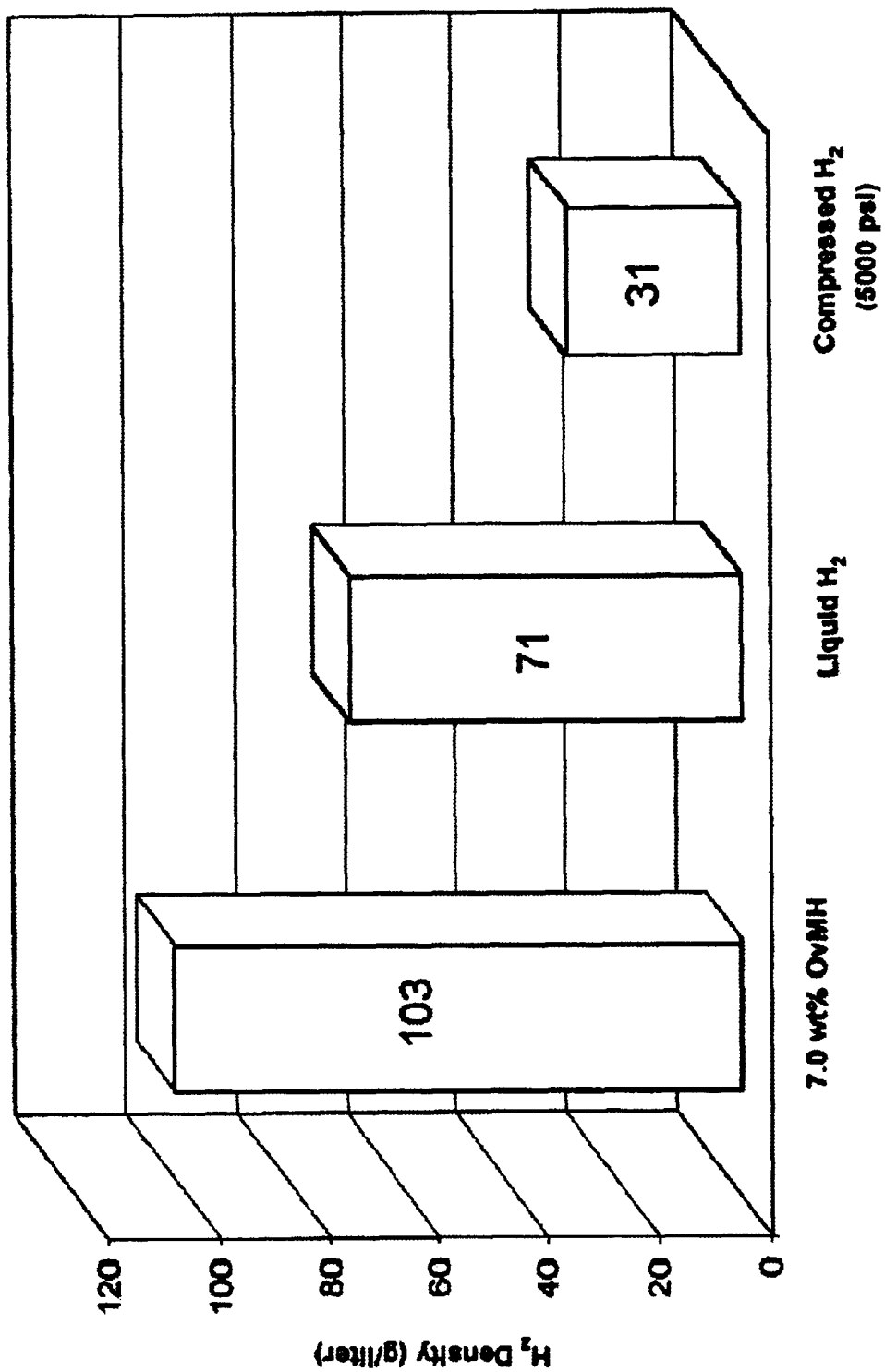
FIG. 1 provides a graphic presentation of the hydrogen storage density in various forms of storage.

Prior to obtaining the desired compacted or densified discrete units of hydrogen storage material useful in this invention it is useful to determine the most advantageous combinations of hydrogen storage capacity, kinetics of hydrogen charging and discharging for the material, as well as, scale, storage, and shipping needs and economies in relation to available materials, forming methods, and shipping and storage means. At that point, materials best suited for the job at hand may be selected. The inventors of the current invention have found that high capacity thermal hydrogen storage materials will generally be preferred but there may indeed be other instances for which other materials, including those having lower kinetics, or capacity may be preferred. The generally preferred materials, at the moment are those which are magnesium-based. Many of these materials are described in U.S. Pat. No. 6,193,929, entitled "High Storage Capacity Alloys Enabling a Hydrogen-Based Ecosystem", filed Nov. 6, 1999 for Ovshinsky et al. with common ownership and having inventors in common; the disclosures and teachings of which are hereby incorporated by reference.

Alloy Preparation

In general the preferred alloys contain greater than about 90 weight % magnesium, and contain at least one modifier element. The at least one modifier element creates a magnesium based alloy which is capable of storing at least about 6 weight % hydrogen and which is capable of absorbing at least about 80% of the full storage capacity of hydrogen in under about 5 minutes at about 300° C. More preferably the modified alloy stores at least about 6.5 weight % hydrogen and is capable of absorbing 80% of the full storage capacity of hydrogen in under about 2 minutes at about 300° C. Most preferably the modified alloy stores at least about 6.9 weight % hydrogen and is capable of absorbing at least about 80% of the full storage capacity of hydrogen in under about 1.5 minutes at about 300° C.

Useful modifier elements mainly include Ni and Mm (misch metal which is known in the art and which generally comprises substantial amounts of lanthanum or cerium and other rare-earth metals including the Group 3 elements; the minor components of which are those metals which are difficult, and therefore costly, to further separate and which are often Pr, Nd, and Sm) and can also include additional elements such as Al, Y and Si. Thus the alloys will typically contain 0.5–2.5 weight % nickel and about 1.0–4.0 weight % Mm (predominantly contains Ce, La, Pr, and Nd). The alloy may also contain one or more of 3–7 weight % Al, 0.1–1.5 weight % Y and 0.3–1.5 weight % silicon. Also, optionally, a small amount (up to 1%) of light elements such as carbon and/or boron, may be added to the alloy to increase the number of catalytically active sites therein. A few examples are presented to help illustrate the preferred hydrogen storage alloys.

EXAMPLE 1

A modified Mg alloy having the designation FC-10 was made which has the composition: 91.0 wt. % Mg, 0.9 wt. % Ni, 5.6 wt. % Al, 0.5 wt. % Y and 2.0 at % Mm. The individual raw alloying elements were mixed in a glove box. The mixture was placed in a graphite crucible and the crucible was placed in a furnace. The crucible had a 2.0 mm boron nitride orifice at the bottom thereof which is plugged by a removable boron nitride rod. The furnace was pumped down to very low pressure and purged three times with argon. The argon pressure withing the furnace was brought up to 1 psi and kept at this pressure as the crucible was heated to 600° C. Once the melt was ready, the boron nitride rod was lifted and argon was injected into the furnace under pressure. The molten alloy flowed out of the graphite crucible through the boron nitride orifice. At this point, the molten alloy would preferably be gas atomized under the argon pressure. It is preferred that rotary atomization be used to gain the preferred larger particle sizes but free-fall geometry is an acceptable means of forming the alloy particles. Melt spinning by flowing the molten material onto a non-water-cooled, horizontally spinning, copper wheel, spinning at about 1000 rpm, solidifying the molten alloy into particles which then bounce off a water-cooled copper cap which covers the spinning wheel, and drop into a stainless steel pan where they gradually cool is also a useable method and one which was used for many experiments. However, gas atomization techniques, particularly including rotary atomization, are preferred. It is useful to keep in mind that particular microstructures of the alloys are preferred and those are the microstructures which may be obtained by rapid cooling or quenching of the molten material. Generally, it is preferred that the quench or cooling rate will be greater than about $10^{3°}$ C./second. To obtain more desirable levels of disorder or better short-range order quenching within the range of between about $10^{3°}$ C./sec. through about $10^{6°}$ C./sec. Greater short-range order or somewhat less disorder may be obtained by quenching within the range of between about $10^{3°}$ C./sec. through about $10^{5°}$ C./sec. Precipitates may grow more and create some more short-range order within the range of between about $10^{3°}$ C./sec. through about $10^{4°}$ C./sec.

For melts in which the product from the cooled copper wheel discharge were used, five grams of the solidified alloy flakes were mixed with 100 mg of graphite grinding aid. The mixture would then be mechanically ground under an inert atmosphere, in this case argon, for 3 hours. The ground alloy would then be transferred into the hydrider within an inert environment, again argon in this instance for hydriding at about 300° C. The hydrided powder would then be sized or classified, in this example by sieving to recover material having a particle sizes within the range of between about 10 μm through about 100 μm, preferably, within the range of between about 10 μm through about 65 μm, or more usefully within the range of between about 20 μm through about 30 μm, in this particular experiment, selection was made for particles within the range of between about 30 μ through about 65 μm. Classification may be accomplished before hydriding but it is generally more efficient to do this after hydriding in light of the expansion of the metal alloy upon hydriding; additionally in light of the preference for hydrided size ranges, classification prior to hydriding simply entails another process step. This alloy has a storage capacity of about 6.5 wt. % hydrogen and absorbs about 80% of the maximum capacity in less than 5 minutes at a temperature of about 300° C. Other details of the alloy properties are presented below.

For those materials for which particles of alloy were formed by gas atomization, it was found that the larger particles were preferred. In the event that the inert environment to which the powder particles are exposed is not fully inert, the larger particles provide greater internal volume which may be exposed, by crushing or otherwise comminuting or grinding, in a non-reactive environment. The larger particle sizes were also simply easier to handle. Effectively any size particle may be made to work; for processes in which particle reduction or internal volume surface exposure is to occur, those with particle sizes within the range of about 100 μm through about 2 mm will be perfectly workable, those with particle sizes within the range of about 200 μm through about 1 mm will be notably useful, and those with particle sizes within the range of about 250 μm through about 500 μm will produce excellent hydride powder.

EXAMPLE 2

A modified Mg alloy having the designation FC-76 was made which has a composition: 95.6 wt. % Mg, 1.6 wt. % Ni, 0.8 wt. % Si and 2.0 wt % Mm. The alloy was formed in the same manner as Example 1, however, the furnace temperature was 850° C. and the orifice size was 2.5 mm. This alloy has a storage capacity of about 6.9 wt. % hydrogen and absorbs 80% of the maximum capacity in less than 1.5 minutes at a temperature of about 300° C. Other details of the alloy properties are presented below.

EXAMPLE 3

A modified Mg alloy having the designation FC-86 was made which has a composition: 95 wt. % Mg, 2 wt. % Ni and 3.0 wt % Mm. The alloy was formed in the same manner as Example 1, however, the furnace temperature was 750° C. and the wheel speed was 1400 rpm. This alloy has a storage capacity of about 7 wt. % hydrogen and absorbs 80% of the maximum capacity in less than 2.3 minutes at a temperature of about 275° C. Other details of the alloy properties are presented below.

EXAMPLE 4

Another particular alloy was found to work very well. Its composition was: 95 wt. % Mg, 2 wt. % Ni and 3.0 wt % Mm. This material was rotary atomized and yielded product with particle sizes with the vast majority being between about 200 μm and about 300 μm with the peak amount centered at about 250 μm. This material, with tap density of between about 0.6 g/cm$^3$–0.7 g/cm$^3$, was placed in a ball mill with a steel ball under argon atmosphere after being evacuated and flushed with argon. Graphite was added and the ball mill was run to reduce alloy particle sizes. The resulting material was hydrided at 300° C. and size-selected by sieving the fraction of hydrided material within the range of between about 20 μm through about 32 μm and compacted into a tablet or pellet with diameter of about 1.6 cm (0.625 in.) and thickness of about 2 mm (0.005 in.) with density approaching theoretical of 1.45 g/cm$^3$. It must be kept in mind that a phase transition from hexagonal to tetragonal unit cell structure occurs for the change from magnesium to magnesium hydride (MgH$_2$); therefore a volume increase of about one third can be expected with magnesium-based storage alloys.

Graphite in this process appears to serve multiple roles. First, it is a grinding aid, second it serves to protect the newly exposed surfaces of the crushed, or fractured, alloy from oxidative reaction, as well as serving a catalytic function for the dissociation of hydrogen molecules to atomic hydrogen. In addition to a graphite grinding aid, heptane may also be added as a grinding aid, alone or in combination with graphite.

General Characteristics

The preferred hydrogen storage alloys are unique in their combination of high storage capacity and excellent absorption/desorption kinetics. A combination of both alloy composition and particle size of the hydrogen storage material have a significant effect on the kinetics. That is, the kinetics of the material (regardless of specific composition) improve with decreasing particle size. Specifically, materials having a particle size under 70 microns are the most useful. More specifically, a 30–70 micron particle size gives excellent kinetics while still being capable of being easily manufactured. Increasing particle size eases manufacturing, but reduces the kinetics of the material, while decreasing particle size via grinding is difficult because of the high ductility of these Mg based alloys. In fact, the use of gas atomization may be required in industry to manufacture bulk quantities of the particulate alloy specifically because the alloys are too ductile to be ground efficiently. One other important point to note about the instant alloys is that, even when hydrided, these finely ground powders do not self-ignite and burn in air, in contradistinction to pure magnesium hydride powders. However, if desired, a mono-atomic layer of a material which protects the particles but passes hydrogen (such as carbon, nickel or a polymeric material) may be coated thereon. For the purposes of this invention including tableting or, pelletizing of the hydrided metal alloy, it is generally preferred that no polymer be included as such presence could be expected to reduce the kinetics of the storage alloy as well as diminish overall capacity of hydrogen storage simply by taking non-hydridable space.

FIG. 2 provides a stylized depiction of the particularly preferred characteristics of hydrogen storage alloys for such alloys to have the favorable kinetics to provide rapid charging and discharging properties. Specifically, FIG. 2 shows how bulk nucleation, in addition to surface nucleation can increase the number of catalytic sites for the dissociation of H$_2$ into 2H. Also, since particles having only surface nucleation sites will first adsorb hydrogen in the surface layer thereof, a sort of "barrier" is created on the surface which slows the further absorption of hydrogen. Thus, what is needed is a way to bypass this surface "barrier" and allow for absorption of hydrogen directly into the interior of the particle.

Small particles have unique properties that bridge the gap between crystalline and amorphous solids, i.e. small geometry gives rise to new physics. It is to be noted that 50 Angstrom particles are "mostly surface," thereby giving rise to new topologies and unusual bonding configurations. Also, 21% of all atoms in a 50 Angstrom particle are on the surface and another 40% are within one atom of the surface. Thus compositional disorder in multi-element micro-alloys is large in small particles, e.g. in a 50 Angstrom particle, each element in a 10 element alloy will show 3% variation in concentration just due to statistics. With such small particles, quantum confinement effects are apparent and band structure effects are disturbed.

This ability to atomically engineer the local chemical and electronic environments allows these environments to provide bulk nucleation within the particles. The instant inventors have found that, by applying the principles of atomic engineering and tailoring of the local chemical and electronic environment, as first taught by Stanford Ovshinsky, magnesium can be modified to store more than 6 wt. % hydrogen, with significantly increased kinetics which allows for economic recovery of the stored hydrogen. The increased kinetics allows for the release of hydrogen at lower temperatures, thus increasing the utility of metal hydride storage in hydrogen-based energy systems. Thus the instant alloys provide commercially viable, low cost, low weight hydrogen storage materials which, to even better meet the needs of a hydrogen economy for safe transportation of hydrogen, are able to be hydrided, followed by compaction, tableting, or pelletization to yield discrete units of compacted hydrided hydrogen storage alloy with the useful characteristics of high density, high charging and discharging kinetics, high storage capacity, and safe handling ability in atmosphere without need for highly specialized handling equipment or containers.

Figure 3:
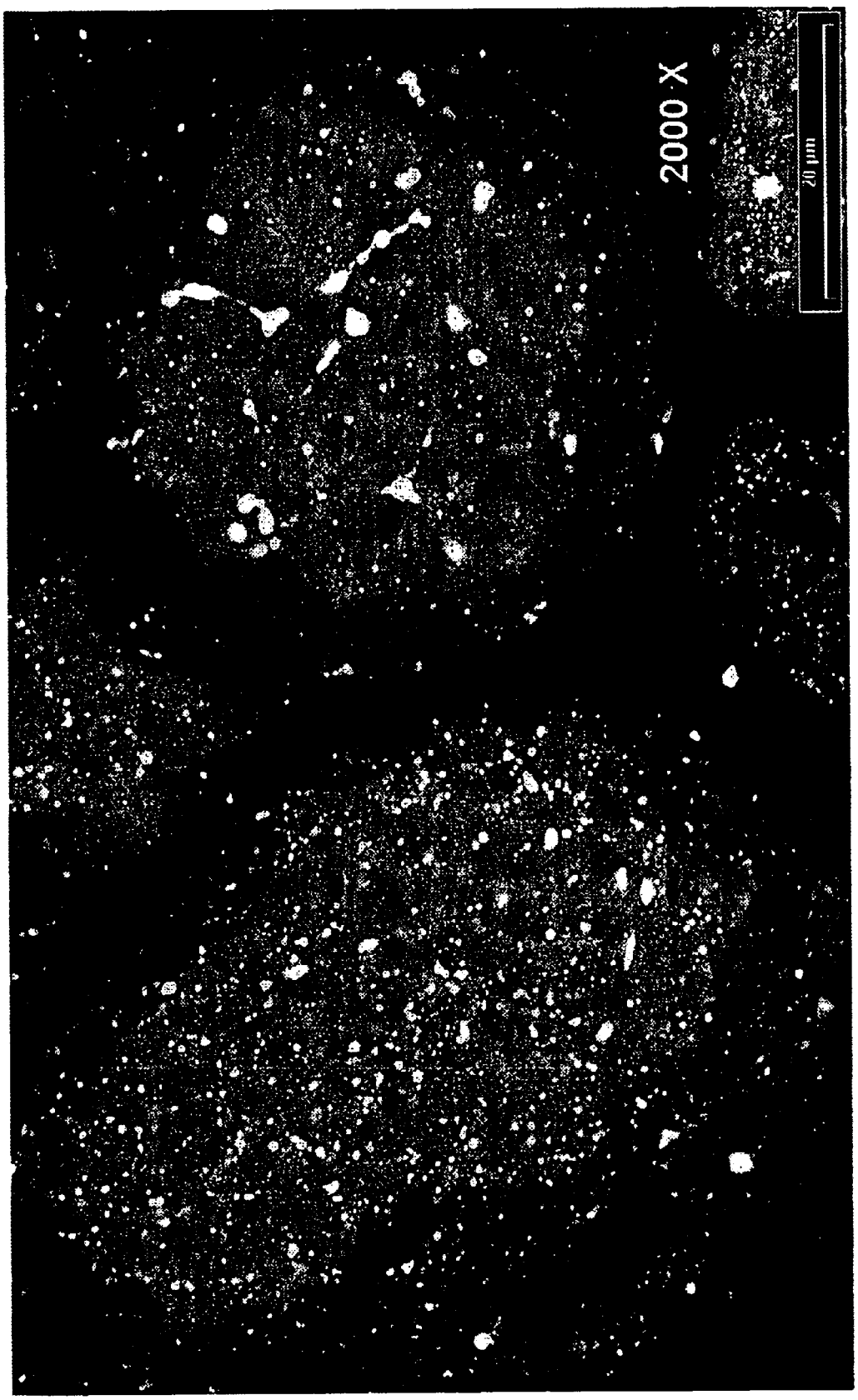
FIG. 3 presents an SEM micrograph of hydrogen storage alloy particles having surface nucleation sites.

FIG. 3 is an SEM micrograph which confirms the effect of surface nucleation on hydriding of a magnesium based hydrogen storage alloy. The material in FIG. 3 initially only absorbs hydrogen at the surface nucleation sites there and hydrogen must thereafter diffuse into the interior or the particle. Specifically, FIG. 3 shows a particle 20 in which only surface hydriding (nucleation) occurs 21. It should be noted that in FIGS. 3 and 4, the lighter areas are the non-hydrided portions of the material, while the darker areas are the hydrided portions of the material.

Figure 4:
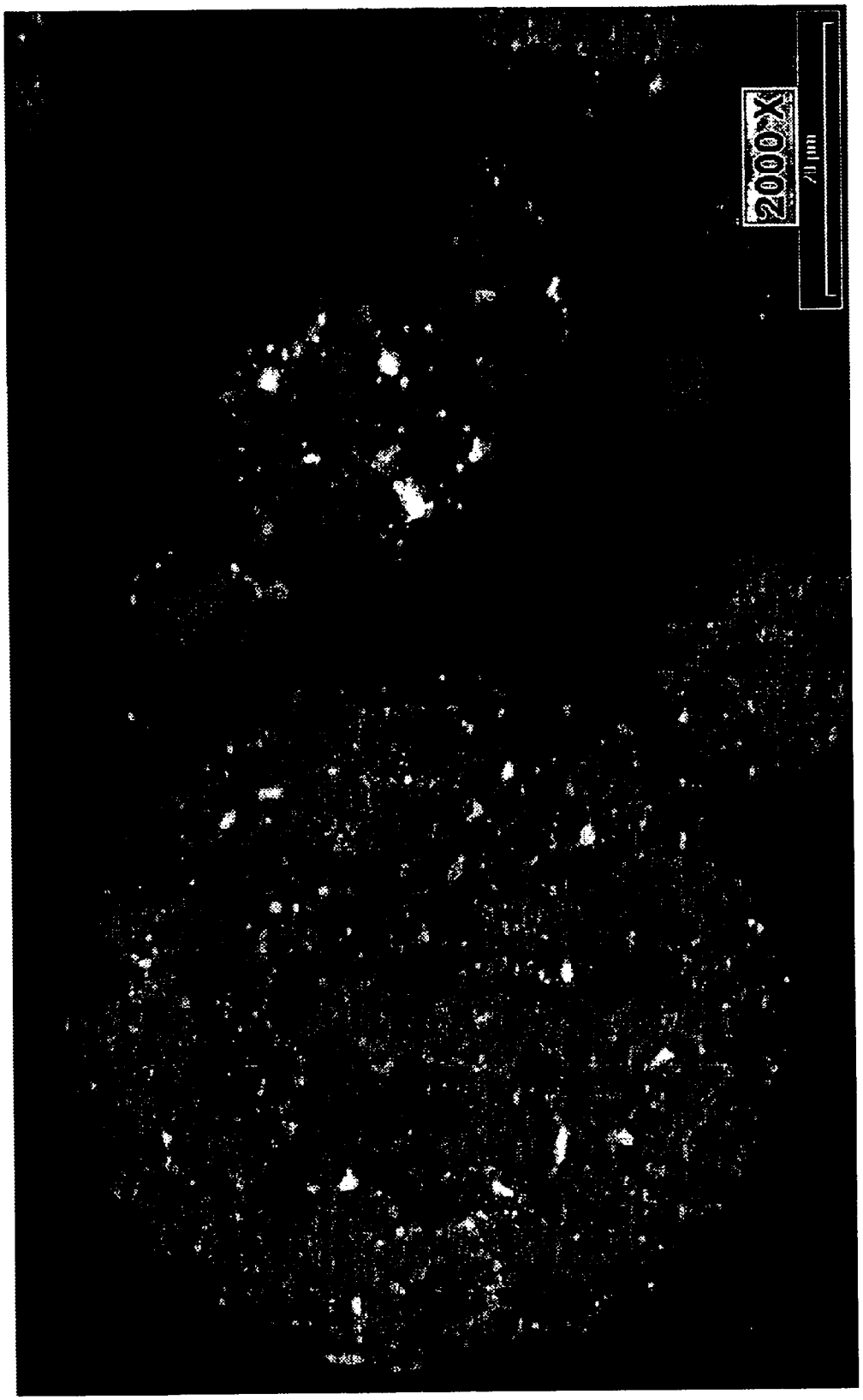
FIG. 4 presents an SEM micrograph of hydrogen storage alloy particles having bulk nucleation sites.

FIG. 4, specifically, is an SEM micrograph which confirms the effects of bulk nucleation (and the associated catalytic sites). The material in FIG. 4 initially absorbs hydrogen at the bulk nucleation sites and therefore hydrogen can more readily be absorbed into the interior of the particle. Specifically FIG. 4 shows another particle 22, which shows hydriding (via catalytic nucleation sites) within the bulk 23.

While this atomic engineering of the local chemical and electronic environments to provide both surface and bulk nucleation has been applied to thermal hydrogen storage materials, it can also be applied to other materials to affect the properties. For instance it can be applied to hydrogen storage materials in general (i.e. electrochemical or thermal) and to materials in general. Specifically desirable materials will be multi-elemental materials which may have been rapidly quenched. They will typically have small crystallite size, under 100 Angstroms, and be particulate materials under 100 microns in size.

When the materials are ground, use of an attritor is the preferred method of grinding. Particularly useful is the addition of a grinding agent such as carbon, particularly graphite, and/or heptane when grinding these alloys.

Material Size Reduction. Hydriding and Classification

With an available alloy, particularly if a passivating surface layer of oxide exists, it is useful to break, fracture, or otherwise reduce alloy particle sizes or open the non-passivated interior to be hydrided and enhance storage capability. Generally, any thermal hydrogen storage alloy will find use in the practice of this invention, those comprising magnesium (Mg) will find particular use in that such alloys are available with notably high hydrogen storage capacity. In general modifiers including the rare-earth metals, nickel, and silicon are useful in tailoring the overall composition and creating local regions of atomically engineered levels of disorder or short-range order. In light of the difficulty of rare-earth purification and the resultant high costs, mischmetal is a useful modifier to include with magnesium thermal storage alloys. Appropriate alloys may then be formed into coarse particles as described in Example 1 above. This is usefully accomplished by gas atomization, preferably centrifugal atomization; the coarse particles produced by rotary atomization are particularly preferred.

The coarse hydrogen storage alloy powder, preferably produced by the atomization process is conveyed, delivered, or otherwise transported to a grinding device, which further reduces (i.e., comminutes) the size of the particles and exposes the inner volume material. The coarse alloy powder may be delivered to the grinder in batches or may be conveyed in a continuous process from the particle forming process.

An attritor, as described in U.S. Pat. No. 5,464,163, the disclosure of which is incorporated by reference herein, is a useful grinder for this purpose; ball-milling and other processes are also quite acceptable. It is useful to keep in mind, when selecting a grinding means, that this process serves the multiple purposes of size reduction, active material exposure, and allows the addition of a catalytic agent such as graphite or other conductive carbon to be added which assists not only the catalysis of the molecular hydrogen to atomic hydrogen but protects the newly exposed surfaces from passivation. The grinding process also increases the surface roughness of the particulate. Since surface roughness is the total surface area divided by the geometric surface area, the increased roughness also provides for an increase in the area of the total exposed surface of the metal particle.

Preferably, the grinding process is performed in an inert environment so that the freshly exposed surface of the hydrogen storage material remains uncontaminated and specifically unoxidized. To provide an inert environment, the grinding chamber should be evacuated and purged with an inert atmosphere such as a noble gas, particularly argon for multiple cycles and then backfilled with an inert atmosphere to provide an inert "gas blanket".

As described above, the grinding process may be performed by an attritor. More generally, this size-reduction may be by any process which mechanically reduces the particle size of the material, exposes the internal volume, and increases available surface area. Examples of other grinding processes which may be used (besides attriting) include crushing, pulverizing, milling, or the like. In addition to using an attritor, the grinding step may also be performed in a device such as a ball mill, drum mill, roller mill, grinding mill, air jet mill, vibratory mill, sand mill, or the like. In some instances the size-reduction step be performed by jaw crushers, air-hammer, hammer mills, hardened mortar and pestle, and the like. Further, while "grinding" has been defined in terms of a mechanical comminution process it is also possible that the particle size reduction may be performed in other ways, such as by the introduction of acoustical, electromagnetic and/or thermal energy.

After the hydrogen storage particles are ground, the material is then hydrided. Preferably, the ground storage alloy powder is transferred from the grinding device to a hydriding device while keeping the powder in an inert environment. This ensures that the freshly exposed surface of the hydrogen storage alloy material delivered to the hydriding apparatus is uncontaminated and active. To provide this inert delivery environment, the delivery system may also be pumped down and purged as described in the milling step above. Delivery of the hydrogen storage material from the grinding device to the hydriding device may be accomplished in batches but is preferably run as a continuous process. For example, as the material is ground, the ground particulate material may be moved from the grinding device to the hydriding apparatus by a delivery means such as a chute, funnel, vibratory feeder, screw conveyor, conveyor belt, or the like.

Figure 5:
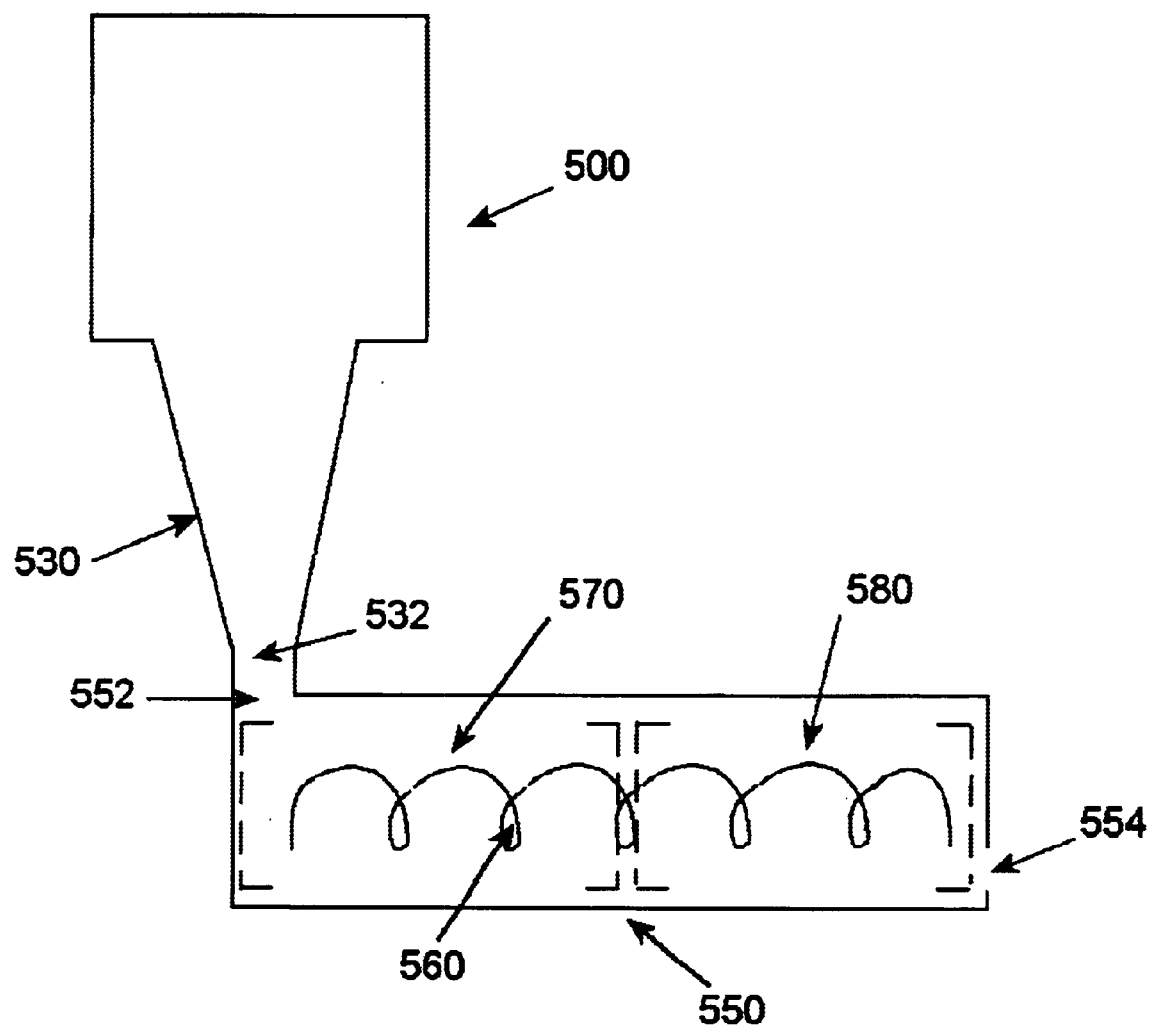
FIG. 5 presents a schematic representation of a continuous grinding and hydriding operation able to occur within a protected non-reactive environment.

FIG. 5 depicts a schematic embodiment of this invention whereby the comminuted powder from the grinder 500 is fed to the hydriding apparatus 550 by way of a powder funnel 530. A load lock (not shown) is preferably disposed between the output 532 of the funnel 530 and the input 552 of the hydrider 550 to isolate the environment of the grinder and funnel from the environment of the hydrider. The load lock ensures that the powder remains in an inert environment as it is transferred from the funnel to the hydriding vessel. In the embodiment shown, the hydriding apparatus has an input 552, an output 554 and a conveyor 560 which transports the powder from the input to the output. In the embodiment shown, the conveyor 560 is a screw conveyor which tumbles and mixes the powder as it moves the powder through the hydriding apparatus. Of course, other useful forms of conveying/mixing systems will be apparent to those skilled in the art without undue experimentation and may be used successfully.

The hydriding procedure includes contacting the material with hydrogen gas under the appropriate pressure, at sufficient temperature, and for an appropriate time to form the hydride of the material. Hence, the hydriding apparatus or enclosure vessel is pressurized with hydrogen gas. In one embodiment of the invention, the hydrogen gas may be between about 10 bar and about 100 bar. The actual operating conditions depend upon the composition and geometry of the hydrogen storage alloy material being hydrided. Factors affecting the mobility of the hydrogen through any different phase regions present and into the material's structure will determine the pressure, temperature and time conditions needed to form the hydride of the material. The hydriding reaction spontaneously starts upon exposure to hydrogen.

Heating the hydrogen storage material during the hydriding process is usefully applied to accelerate the hydriding step. Hence, it is preferable that at least a portion of the hydriding vessel be maintained at a comparatively high temperature to facilitate the hydride reaction. Preferably, at least a portion of the hydriding vessel is appropriately heated so that so that hydriding step takes place at a temperature of at least 200° C., more preferably at a temperature of at least 250° C. and most preferably at a temperature of at least 300° C. It may be noted that hydride formation is an exothermic reaction, heat from which will assist in heating the hydriding zone.

Upon completion of the hydriding process, the material may be cooled prior to leaving the hydrider. This may be accomplished by simply conveying through a region of the hydrider being kept at a lower temperature. In the embodiment of the hydrider shown in FIG. 5, the hydrider 550 includes a "heating region" 570 in which the material is appropriately heating during the hydriding process. Also included is a "cooling region" 580 in which the material is appropriately cooled. The heating region 570 and the cooling region 580 may be environmentally isolated from one another.

The time in which the hydrogen storage material is exposed to the hydrogen is also a result-effective variable which can be controlled to effect the hydriding process. In the embodiment of the hydriding vessel shown in FIG. 5, the time of exposure may be controlled by adjusting the speed with which the screw conveyor 560 transports the material through the hydrider 550.

The hydrider used in the present invention is preferably a vessel having sufficient internal space to accomplish necessary hydriding and fabricated from material adapted to withstand extremes of both temperature and pressure. In one embodiment of the invention, the hydrider will be fabricated from stainless steel, which material is well adapted to withstand the temperature and pressure levels required in ordinary operation for the apparatus. Temperature ranges may be from 50° C. to about 500° C. Pressure ranges may be from below about $10^{-4}$ torr to at least about 1000 psi.

The hydrider of the present invention preferably includes several valves, or other access means, for the introduction and evacuation of gases therefrom. For example, the hydrider may be equipped with at least one reaction gas inlet/outlet value and at least one pressure relief valve. Also, the hydrider of the present invention is preferably equipped with a means for heating all or a portion of the. interior of the hydrider. Heating may be accomplished by any suitable means. Methods of heating include heating coils and/or inductive heating. Also included may be means for cooling all, or a portion, of the interior of the hydrider. The cooling may be accomplished by a cooling jacket that at least partially surrounds all or a portion of the open volume of the hydrider.

The hydrided modified alloy is more stable and less flammable or pyrophoric than the magnesium base or the unhydrided alloy. Hence, the hydriding process makes the material more suitable for storage and transport.

After the hydrogen storage alloy is hydrided, it may be handled comparatively easily without the need for a protective environment. The particulate material is "sized" or classified so that a desired range of particle sizes will be permitted to pass on to the next material processing step. The desired range of particle size is between about 10 $\mu$m and about 100 $\mu$m. Over-sized particles will be transported or recycled back to be reground. As described in Example 1, the general description for each example, preferred size ranges from about 10 $\mu$m through about 63 $\mu$m, with about 20 $\mu$m through about 32 $\mu$m being more preferred. The step of sizing the particles may be accomplished in numerous different ways. Sieving, air (or a selected gas) classifying, vibratory separation, and other methods are among those which will be found useful.

The sized, hydrided bulk material has a tap density roughly in the range of about 0.6 g/cm$^3$ through about 0.7 g/cm$^3$. The amount of hydrogen stored in such a material is remarkably high but for purposes of shipping and economic transport of hydrogen, higher density would be preferable. Additionally, as with any powder, dusting and handling present some difficulties; again, greater density would be preferred. Handling without dusting, particularly since such material amounts to more than nuisance dust, a different form would be appreciated. For these reasons, the bulk powder is next compacted into discrete units or compacts which are preferably generally uniform in size and shape although there may be applications and conditions in which packing or operational requirements favor a mix of differing sizes of compacts, tablets, or pellets. Whatever the mix of tablets and sizes, it is generally preferred that the pellets approach the theoretical density of the hydrided hydrogen storage alloy or material.

Compaction of Hydrided Powder

In accordance with the present invention, the instant pellets have a density greater than about 50% of the hydrided alloy's theoretical density. The compacted material preferably has 2 wt % or more of occluded hydrogen. The compacted material preferably has a density between 85% and 100% of theoretical density and more preferably between 90% and 100% of theoretical density. Theoretical density is a concept known in the art and refers, in this instance, to the maximum theoretical density of fully the hydrided hydrogen storage alloy. Theoretical density here is calculated by determination of the unit cell structure including lattice dimensions as derived from X-ray diffraction study, understanding the atoms present in the unit cell, and their mass contributions to unit cell mass divided by the unit cell volume. In this manner, one skilled in the art may readily determine theoretical density of the fully hydrided metal hydride material and replicate or design a variety of materials formed in accordance with the present invention. In a preferred embodiment here, the compacted material preferably has a density of about 0.8 g/cc to about 1.45 g/cc.

The compacted material comprises a plurality of particles that form a discrete body, preferably having a defined shape and shape integrity which is not subject to easy deformation or loss of particles from its makeup. The particles forming the compacted material are hydrided hydrogen storage powder, preferably with size of about 10 to about 100 μm, more preferably with a size of about 20 to about 63 μm, and most preferably with a size of about 20 to about 32 μm. While not wishing to be bound by theory, the particles will adhere to one another by shape deformation during compaction at high pressure.

The compacted material may be any small shaped body, such as a pellet, tablet, capsule, low aspect-ratio cylinder, and the like. Examples of suitable shapes include those shown in FIG. 6. While the shape of the compacted material is not inherently critical, it will preferably enhance whatever packing or packaging preference is determined.

Our testing tablets or pellets had a diameter less than about 2.5 cm. (1 in.), preferably 1.6 cm. (⅝ in) or less. Tablets of compacted material had thickness of about 4 mm or less, preferably about 2 mm or less. Preferred compacted materials have a shape and size suitable for providing a tablet-packing density with 30% open volume or less and more preferably with 25% open volume or less. Producing a compacted body with a predetermined shape improves control of packing density and the amount of compacted materials per unit volume. Preferably the tablet-packing density is 0.8 g/cc to 1.3 g/cc.

A plurality of bodies or tablets of compacted materials may be stored and shipped in bulk transport containers such as cargo transport containers, etc. for shipment and/or future use in hydrogen storage systems, such as OVONIC HYDROGEN STORAGE SYSTEMS™. The compacted material may be pressed to maximize the amount of active material per body. To achieve maximum active material loading, the compacted material may lack or substantially lack any binder or binding materials.

The hydrided alloy material may be any type of hydrogen storage material, especially those with high thermal hydrogen storage capacity, including $AB_2$, $AB_5$, modified $AB_2$ and $AB_5$ materials, gas phase hydrogen storage materials, or magnesium based materials, many of which are conventional and known to those skilled in the art. Preferably the compacted material comprises a Mg based hydrogen storage alloy as disclosed above. The Mg alloy preferably has at least one modifier and can store at least 2 wt % hydrogen. The Mg alloy also preferably has a theoretical density of about 1.45 g/cc.

In practice powdered, hydrided, hydrogen storage alloy material is placed in a die and compressed with a force suitable for providing a densely packed shape. The compacted material may be formed by any suitable compression means, such as mechanical pressing, gas compacting, vacuum compacting, centrifugal compacting, rolling, die, chemical compression, precipitation compression, etc. The material is preferably compressed with a force suitable for providing a densely packed body as described above. Preferably the force is 170,000 psi or greater, and more preferably 175,000 psi or greater.

The compaction process may be automated by any suitable method. Preferably, the compaction process comprises a powder dispenser; a mold or die in communication with the dispenser; and a press mated with the mold or die. The powder dispenser apportions hydrided material to the die. The press mates with the die to form a densely packed, shaped body. The device for compaction may comprise a plurality of dies, such that automated compacted material formation may be rapidly performed to produce over 1,000 bodies/min. The dies are preferably of similar volume, shape and size. Thus, a plurality of compacted materials of substantially uniform size, shape, and weight may be rapidly manufactured to provide optimized packing density, improved safety and distribution, and increased utilization of hydrogen storage materials.

Indeed, suitable means for accomplishing such high volume, high density, regular tableting compaction may be found within the pharmaceutical production industry. Such machines and dies are available to produce an infinite variety of like-density and shaped pellets. Several examples of such densified compact shapes and sizes are found in FIG. 6.

Figure 7:
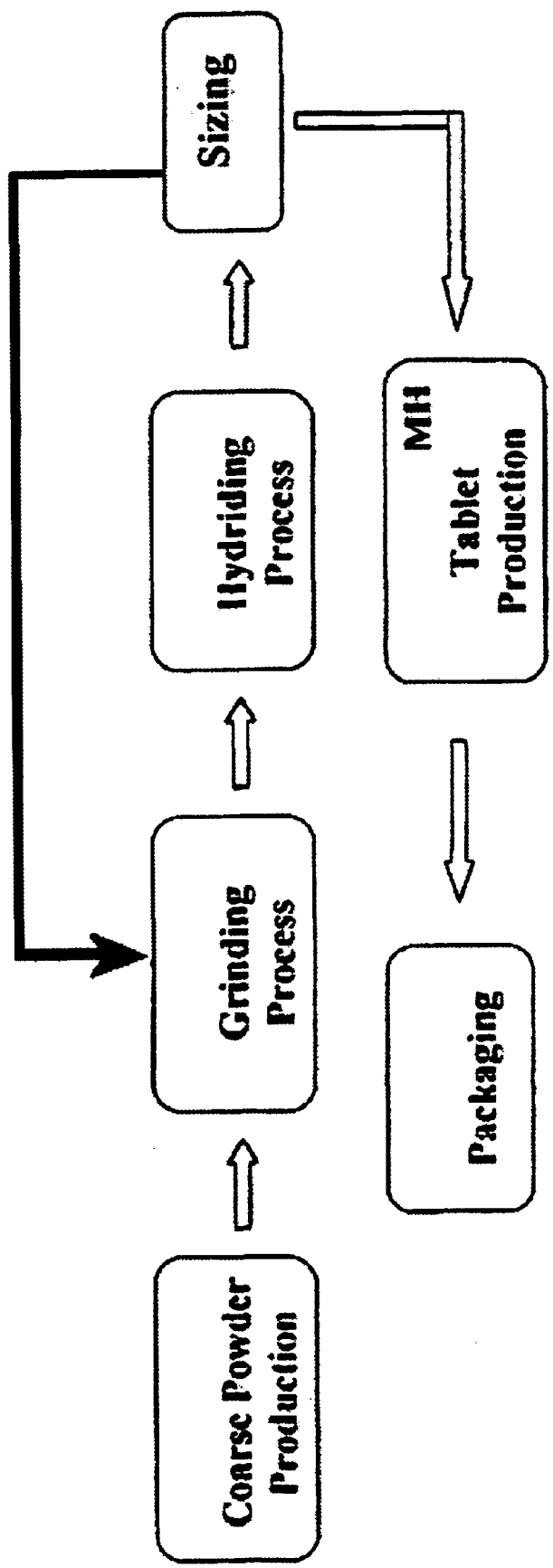
FIG. 7 provides a schematic representation of a production process for making tablets of hydrided hydrogen storage material or alloy in tablet form and their packaging; the grinding and hydriding steps may usefully be reversed.

FIG. 7 provides a schematic overview of the production process for making the tablets of hydrided hydrogen storage material or alloy of the instant invention and their packaging. It should be noted that the grinding and hydriding steps may usefully be reversed.

While the invention has been described in connection with preferred embodiments and procedures, it is to be understood that it is not intended to limit the invention to the described embodiments and procedures. On the contrary it is intended to cover all alternatives, modifications and equivalence which may be included within the spirit and scope of the invention as defined by the claims appended hereinafter.

What we claim is:

1. A hydrided magnesium based hydrogen storage alloy pellet produced by:

a) hydriding a magnesium based hydrogen storage alloy; and b) compacting and pelletizing said hydrided alloy;

wherein the pellet substantially lacks a binder.

2. The compacted alloy of claim 1, wherein said pelletized compacted magnesium based hydrogen storage alloy has a density between 80% and 100% of its theoretical maximum.

3. The compacted alloy of claim 2, wherein the density is between 85% and 100% of its theoretical maximum.

4. The compacted alloy of claim 3, wherein the density is between 90% and 100% of its theoretical maximum.

5. The compacted alloy of claim 1, wherein the density of the compacted alloy is 0.8 g/cc to 1.45 g/cc.

6. The compacted alloy of claim 1, wherein the alloy comprises a plurality of compacted particles, the particles having a size of 20 to 63 μm.

7. The compacted alloy of claim 1, wherein the alloy comprises a plurality of compacted particles, the particles having a size of 20 to 63 μm.

8. The compacted alloy of claim 1, wherein the pellet is shaped for providing a packing density with less than 30% open volume.

9. The compacted alloy of claim 1, wherein the pellet is shaped for providing a packing density with less than 25% open volume.

10. The compacted alloy of claim 1, wherein the pellet has a diameter of 1 inch or less.

11. The compacted alloy of claim 1, wherein the pellet has a thickness of 4 mm or less.

12. The compacted alloy of claim 11, wherein the pellet has a thickness of 2 mm or less.

13. The compacted alloy of claim 1, wherein said compacted alloy comprises a hydrogen storage alloy having more than about 90% magnesium and at least one modifier element.

14. The compacted alloy of claim 1, wherein the alloy comprises about 2 wt % or more of occluded hydrogen.

15. The compacted alloy of claim 1, wherein there are a plurality of pellets and each pellet is of substantially uniform size, shape, and weight.

16. The compacted alloy of claim 1, said compacted alloy having a mechanically stable structure.

* * * * *